# 2,891,669

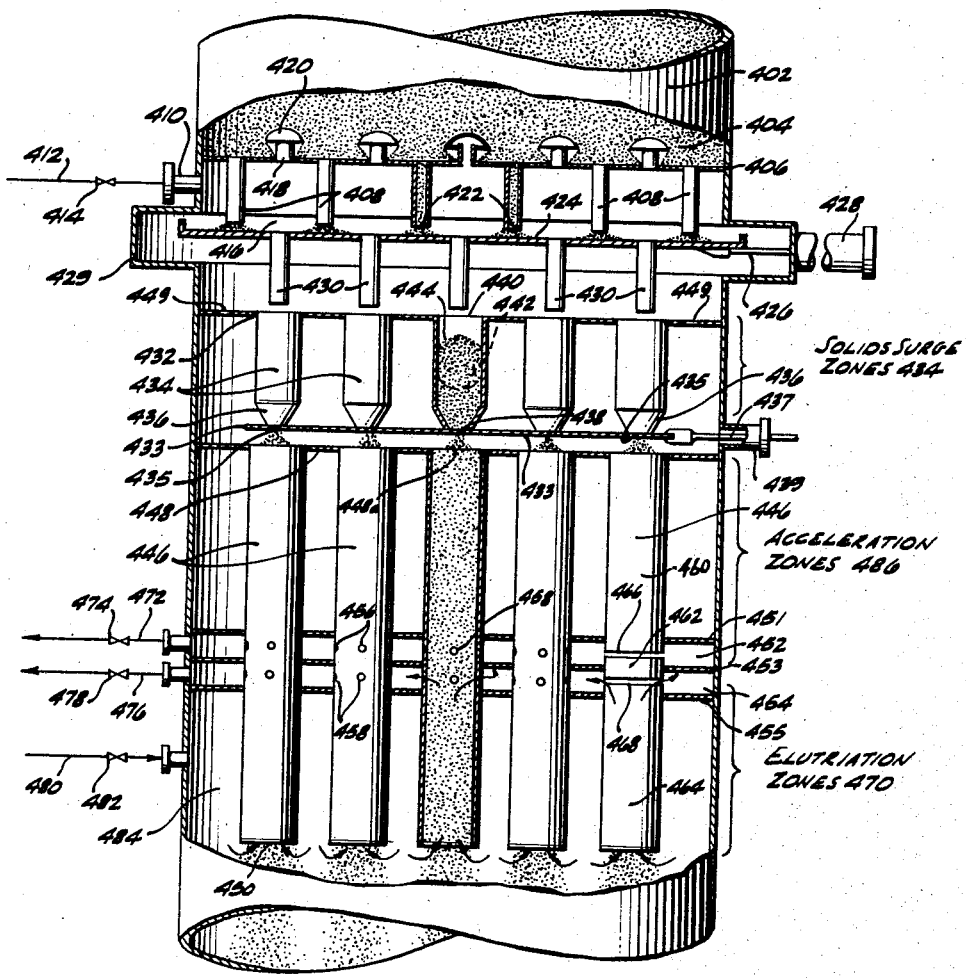

SOLIDS HANDLING SYSTEM

William C. Lieffers, Santa Ana, and Frank C. Riddick, Jr., and Robert L. Switzer, Long Beach, Calif., assignors to Union Oil Company of California, Los Angeles, Calif., a corporation of California Application January 20, 1955, Serial No. 483,121

2 Claims. (Cl. 209—138)

This invention relates to an improved process and apparatus for handling granular solids and in particular relates to the handling of granular solid materials in an improved-solids fluid contact system. Although there are many different kinds of solid fluid contact which are presently effected on a large scale commercial basis in modern industrial operations, the noncatalytic and catalytic hydrocarbon conversion operations in which the hydrocarbon is brought into contact at conversion conditions of temperature, pressure, and composition for a variable reaction time in the presence of catalytic or noncatalytic solid granular contact material are probably typical of most such fluid contact processes. Most of these processes are carried out in the presence of solid contact material which is circulated by any suitable means through a series of contact zones including one or more reaction zones and at least one solid contact material regeneration zone.

In such solids-fluid contacting processes the solid contact material is circulated in a closed cyclic path which includes a series of alternate contacting columns and solid conveyors. The fluid or fluids to be contacted are passed at conversion or reaction conditions through one or more of the contacting vessels to achieve the desired degree of fluid reaction or solid treatment and the effluent product fluid is disengaged from the solids and subjected to further processing or storage. In nearly all such circulated solids processes a spent or deactivated stream of solid contact material is produced, such as the spent hydrocarbonaceous catalyst in hydrocarbon conversion processes. This material is reactivated or regenerated by a further solid-fluid contact in a regeneration column under suitable processing conditions. The regenerated solids continue in the closed cyclic path and are passed back to contact further quantities of the other fluids.

In hydrocarbon conversion processes for example, such as the well known catalytic and noncatalytic processes for hydrocarbon cracking, hydrocracking, coking, desulfurization, denitrogenation, isomerization, polymerization, aromatization, reforming, hydrogenation, dehydrogenation, and others, a solid contact material which is usually but not necessarily a granular catalyst, is circulated through a series of solid-fluid contacting zones including a hydrocarbon conversion zone, a catalyst stripping zone, a catalyst regeneration zone, a catalyst elutriation zone for solids fine removal, and possibly a catalyst pretreatment zone. The foregoing zones are sometimes consolidated in a single contacting column, but in many instances two or more contacting columns are employed standing adjacent each other. In such cases some means necessarily must be employed for granular solids conveyance from one processing step or column to the next.

In the past the granular solids have been conveyed in some processes by means of bucket elevators, but these have been found to be disadvantageous in that the solids conveyance capacity is too low for the physical size of the equipment required, the loading and unloading of the buckets cause excessively high attrition of the granular solids, and because the moving mechanical parts operate at elevated temperatures the lubrication and other maintenance is exceedingly difficult.

Pneumatic or gas lift conveyors have been employed in some of the processes, but these are subject to serious difficulties in that an excessively large volume of conveyance fluid moving at high velocity is required, the granular solids being conveyed impact against each other and against the internal walls of the equipment as they are carried in suspension causing series solids attrition and equipment erosion, etc.

A very recent and probably the only fundamental modern advance in solids conveyance involves the conveyance or recirculation of granular solids under the influence of a pressure gradient maintained in a conveyance conduit by means of a concurrent conveyance fluid flow at very low velocity and low volumetric rate in which the granular solids move as a continuous dense mass of granular solids having a bulk density substantially equal to that of the granular solids when at rest. There are no moving mechanical parts, the solids move at low velocity under conditions which totally prevent solids to surface impact, and the solids loss due to attrition and equipment erosion have been reduced substantially to zero. Because the granular solids are not dispersed or suspended in the conveyance fluid phase, but are conveyed as a dense mass in plug type flow, extremely high volume or weight rates of solids conveyance are permitted in relatively small sized equipment. For example, synthetic bead cracking catalyst is easily conveyed at rates up to about 38,000 pounds per hour in a conveyance conduit having a minimum inside diameter of 3 inches, and catalyst circulation rates of 600 tons per hour at 950° F. are readily effected in a conveyance conduit having a minimum inside diameter of 14 inches. These remarkably high rates are achieved with the substantial absence of the other problems briefly mentioned above.

A problem which is characteristic of all recirculating solid-fluid contacting processes involves the efficient removal of solids fines from the circulating solids stream. There is invariably a small amount of solids fines present in the solids stream due to the fact that the granular solids move. Although the dense phase conveyance of these solids eliminates better than 99% of the attrition and erosion which produces these fines, prolonged operation will invariably give rise to the presence of this fine material. The continuous separation of solids fines from a recirculating stream of solids has in the past been accomplished by elutriation of the solids by a fluid flowing at controlled velocity, but invariably some fine solids remained and some solids having average dimensions greater than those desirably removed were also removed with the fines.

The present invention therefore is directed to an improved solids-fluid contacting process of general application wherein substantially all of these problems are successfully avoided. Particularly this invention is directed to an improvement in those catalytic or noncatalytic hydrocarbon contact processes in which a liquid or partially vaporized hydrocarbon is brought into contact with a recirculating stream of solid granular contact material. The present invention is also directed to the specific solids handling technique herein described by means of which the novel results have been obtained.

It is a primary object of this invention to provide an improved system for solids flow control and fines elutriation from the recirculating stream of granular solid contact material in a solids fluid contacting process.

It is a more specific object to provide an improved process for the elutriation of solids fines at increased efficiency from any larger sized solid particles.

It is a more particular object to provide an improved elutriation process in which the solids mixture is first subjected to gravity acceleration in the substantial absence of fluid flow for sufficient time to bring each solid particle to a substantial portion of its terminal velocity and then contacting the falling solids countercurrently with an elutriation fluid flow of controlled velocity thereby decelerating and suspending the solids fines without carrying out any larger than desired sized particles in the elutriation fluid.

It is another object of this invention to provide, in addition to the specific elutriation process, a combination therewith of a solids metering and flow controlling system in which granular solids are intermittently withdrawn at a predetermined average rate from a solids zone and then introduced at a constant rate, in spite of the intermittent supply, into the solids elutriation system.

An additional object of this invention is to provide an improved apparatus for effecting the aforementioned invention.

Other objects and advantages of the present invention will become apparent to those skilled in the art as the description and illustration thereof proceeds.

Briefly the present invention comprises an improved solids contacting process and apparatus in which granular solids are circulated through at least one and usually a plurality of serially connected contacting zones in a closed cyclic path. The fluid contacts the granular solids in the several zones in which the solids are moving either as dense compact beds or as fluidized bodies maintained in turbulent suspension by the contacting fluid flow. After disengagement of the fluids from the solids, the solids are passed either by gravity or by a positive conveyance step to the next contacting zone. Because of the fact that the solids are in motion, solids fines having average diameters considerably less than those desired in the circulating solids stream are formed. These solids fines accumulate in the recirculating solids stream and are undesirable therein for many well known reasons, most of which are concerned with uniformity of solids and fluid flow and solid-fluid contact in the contacting zones.

One specific feature of the present invention involves an improved process and apparatus for handling such granular solids to control simultaneously the over-all solids flow rate, the distribution of solids removal throughout the cross sectional area at the bottom of a moving bed of solids in a contacting zone, and also to separate the aforementioned solids fines from the main solids stream. This fine solid separation is effected at very high efficiency, that is, without substantial removal from the solids stream of solid particles having average dimensions equal to or greater than those desirable in the solid material.

This improved solids handling system comprises in combination a solids metering step and an improved solids elutriation step which cooperate together to produce the results indicated above. In controlling the over-all solids flow rate and distribution of solids removal throughout the cross section of a superjacent moving solids bed, the solids are withdrawn therefrom intermittently at a plurality of drawoff points uniformly spaced throughout the lower cross section of the downwardly moving solids bed. The solids are withdrawn in successive measured volumes which are positively controlled at an average rate which is equal to the desired solids circulation rate, and passed into one or more solids surge zones in which the levels fluctuate. Solids are discharged from each surge zone in a continuous stream having a total flow rate which is controlled at a constant value equal to the average rate at which the solids are intermittently admitted to the surge zone.

This continuous flow of solids is then passed by gravity in one or more substantially equal streams into a subjacent solids elutriation system. This system comprises one or more vertically disposed elutriation conduits or columns containing a solids acceleration zone, one or more elutriation fluid disengaging zones, and an elutriation zone at successively lower levels therein. A continuous stream of solids flows downwardly as a shower from each of the solids surge zones mentioned above into an elutriation conduit and passes successively through the acceleration zone, the disengaging zone, and the elutriation zone. The larger fines free solids discharging at the bottom of the elutriation conduit or conduits are collected and continue in the cyclic solids path referred to above.

In passing through the acceleration zone, each granular particle is accelerated by gravity in the substantial absence of a fluid flow through a distance sufficient to bring substantially all of the solids, except perhaps the largest ones, substantially to their terminal velocity under pressure, temperature, and fluid composition conditions existing therein. The largest solids are accelerated sufficiently to attain a substantial portion of their terminal velocity. This acceleration step is exceedingly important in the process of this invention because it permits the larger solids sufficient time to reach substantially their terminal velocity where as the smaller fine solids reach their much lower terminal velocity very quickly. The solids shower discharging from the bottom of the acceleration zone is characterized by the fact that substantially all of the solids are moving at their terminal velocity as they enter the subjacent elutriation zone and under such conditions the velocity difference between the small undesirable solids fines and the larger desirable solids is at a maximum.

The solids shower passes through an elutriation fluid disengaging zone or zones and continues downwardly through the elutriation zone in which it contacts a countercurrent flow of elutriation fluid. This fluid flow resists the downward motion of all the solids and decelerates them to a degree dependent upon the terminal velocity of the solids and the upward velocity of the elutriation fluid. The deceleration effect upon the small low velocity solids at a given elutriation fluid velocity is found to be considerably greater than that upon the larger high velocity solids. The larger solids having higher velocities and greater momentums continue downwardly, decelerating slightly, and discharge from the bottom of the elutriation zone while the smaller solids are decelerated completely and given an upward velocity forming a solids fines suspension in the elutriation fluid. This suspension passes upwardly through the elutriation zone and is disengaged from the downwardly flowing solids shower at an intermediate elutriation fluid disengaging zone. The fines may be separated from the elutriation fluid and discarded or reprocessed into larger particles. The elutriation fluid may be discarded or recirculated in the system. The elutriation fluid velocity upwardly through the elutriation zone is controlled to remove only those solids which are undesirable in the main recirculating solids stream. The contamination of fines with larger solids has been found to be virtually eliminated in this process.

The physical size of the acceleration zone required in the present invention varies considerably with specific conditions existing in the solids contacting process. The transverse cross sectional area of the acceleration zone depends upon the flow rate of solids to be elutriated and is made sufficiently large so that after acceleration the solids shower has an average density between about 0.5% and about 30% of the maximum or static bulk density of the granular solids when dense packed. The length of the acceleration zone is dependent upon the density $\rho$ and the viscosity $\mu$ of the relatively stationary fluid existing therein, upon the absolute density $\rho_s$ and the average diameter D of the individual solid particles, and upon the degree to which the larger solids are to approach their terminal velocity. The physical characteristics of the fluid of course change with the existing conditions of pressure and temperature. The minimum length of the acceleration zone is calculated from the well known equations defining the velocity and position of falling bodies and the terminal velocity attained by a given solid particle under given conditions. It has been found that a length sufficient to bring the largest particles to about 50% of their terminal velocity is sufficient and preferably the length is sufficient to accelerate the larger particles to a velocity such that on entry into the elutriation zone these solids are moving substantially at their terminal velocity relative to the elutriation fluid. This is an actual downward velocity equal to the terminal velocity in still fluid minus the elutriation fluid velocity. An acceleration zone with a greater length improves the separation only slightly and lengths beyond that which brings the largest solid to its terminal velocity in the acceleration zone has no effect upon the separation.

Without the acceleration step described above, all of the granular solids introduced into the elutriation zone would have substantially the same velocity, namely the velocity at which they flow through the outlet of the conduit which introduces solids into the elutriation conduit. Under such conditions the elutriation fluid is found to remove at least some of the larger sized solids quite indiscriminately along with the undesirable solids fines. This requires an additional fractionation step to recover the larger desired solids and return them to the main stream. This problem and the extra processing step required are avoided in the process and apparatus of this invention.

In the present invention the solids surge zone referred to above is exceedingly important in that it is found to contribute to the efficient fines removal above described. If the flow rate of solids passing into the elutriation zone is variable, as it would be if solids were intermittently introduced directly from the solids flow control step, the average solids concentration in the solids shower is widely variable. This results in radical changes in the average density of the suspension which in turn causes, by sheer turbulence and displacement effects, a substantial variation in the actual velocity of the elutriation fluid, in spite of the fact that the rate of elutriation fluid introduction is maintained at an absolutely constant value. Any change in the elutriation fluid velocity seriously affects the degree of elutriation and the size of solids removed. Accordingly, in the present invention the intermittent solids metering system and the solids surge zones cooperate together to transform a controlled intermittent solids flow into a continuous solids flow in which smooth and reproducible elutriation of only those solids fines having an average diameter less than some predetermined value is obtained.

With a constant source of solids flow, the elutriation process and apparatus of this invention is highly useful apart from the solids feeding and surge system described. Furthermore when the solids do not require elutriation, the solids metering and surge device is very useful in controlling solids flow rates and providing a constant flow of solids at that desired rate.

Referring now more particularly to the attached figure, a detailed elevation view in partial cross section of an apparatus adaptable to solids flow rate and distribution control, acceleration, and elutriation in large scale solids fluid contacting processes is shown.

Column 402 contains a downwardly moving bed of solid granular contact material 404 which is supported by upper stationary tray 406. Dependent from tray 406 is a plurality of open ended vertically disposed charging zones or tubes 408 which are uniformly distributed throughout the cross sectional area of the tray. This permits a uniform withdrawal of solids from moving bed 404, and insures the uniform downward flow of solids therein.

If desired, in order to introduce into or remove a fluid from moving bed 404, inlet 410, provided with line 412 and valve 414, may be provided. The open space 416 below tray 406 and surrounding tubes 408 comprises a disengaging or an engaging zone which operates in conjunction with riser conduits 418 and caps 420, by means of which fluid flow through tray 406 is permitted.

The lower outlet openings 422 are disposed above and adjacent reciprocable tray 424 which is supported within column 402 by any conventional means such as vertical hanger rods, horizontal slides, etc. not shown. Tray 424 is connected through connector 426 with reciprocating means 428 by means of which tray 424 is given a linear oscillatory motion in a horizontal plane within the cylindrical section defined by annular channel 429. Extending downwardly from tray 424 is a plurality of catalyst feeder zones or tubes 430 which are open at their upper and lower ends, and which are arranged on tray 424 in a relatively uniform pattern. The arrangement of tubes 430 relative to the arrangement of tubes 408 is such that when tray 424 is oscillated, feeder tubes 430 are alternately aligned with charging tubes 408 while their outlet openings are sealed against the upper surface of lower stationary tray 432, and then feeder tubes 430 are each aligned with one of a plurality of solids surge conduits or zones 434 while their upper inlet openings are misaligned with charging tubes 408 and the lower outlet openings of charging tubes 408 are sealed against the upper surface of reciprocable tray 424.

The total volume of feeder tubes 430 is equivalent to a certain weight of solids depending upon the bulk density thereof. As tray 424 is reciprocated as described at a fixed rate, a fixed amount of granular solids are withdrawn from moving bed 404 through tubes 408 and are discharged into surge conduits 434 from feeder tubes 430. The rate of this intermittent solids transfer is fixed by the rate of reciprocation of tray 424, and the solids feeding rate is readily varied by providing a variable control at motive means 428.

Solids surge conduits 434 are provided with relatively large volumetric capacities relative to those of feeder tubes 430. They are also provided at their lower extremities with a solids flow restriction 436 of variable area. The lower outlet opening 438 is made adjustable by means of tray 433 provided with apertures 435 which are aligned with outlet openings 438 sufficient to give a continuous solids flow rate which is equal to the average rate set by reciprocating feeder tray 424. The setting of tray 433 is varied by means of rod 437 which extends through nozzle 439 in the column wall. The outlet may also be made adjustable by providing a rotatable orifice plate immediately therebelow. In these ways the continuous rate of solids discharge therefrom may be regulated so as to be equal to the average rate of intermittent introduction of solids thereto through upper inlet opening 440 from feeder tubes 430.

Reciprocable tray 424 is shown in position at which feeder tubes 430 have just discharged solids into surge conduits 434 whereby the solids level in the surge conduit shown in cross section was raised from position indicated at 442 to that indicated at 444. The granular solids discharge at outlet 438 is substantially constant in spite of the increased depth of solids in surge conduits 434 when the minimum solids level is greater than about three outlet opening diameters above the outlet. As the rate of feeder tray reciprocation is increased, outlet openings 438 may be increased in area by moving the tray 433 to uncover more of the lower outlet from surge conduits 434, and the rate of flow of solids from outlet 438 is thus maintained equal to the average rate of intermittent solids removal by means of reciprocable tray 424.

Lower stationary tray 432 is provided with one or more apertures 449 opening therethrough and which serve to maintain the space within solids surge conduits 434 under isobaric conditions to insure the absence of fluid flow through surge conduits 434 and maintain solids flow rate therein solely determined by the open area of outlets 438.

Disposed immediately below each of solids surge conduits 434 is an elongated elutriation conduit 446 dependent from an upper transverse tray 448. These conduits are open at their upper and lower ends, receive a continuous stream of solids to be elutriated through inlets 448a, and discharge a continuous stream of fines-free elutriated solids from lower outlets 450. Intermediate the upper and lower ends of elutriation conduits 446 are one or more elutriation fluid disengaging zones 452 and 454, defined respectively by transverse trays 451, 453, and 455. These disengaging zones communicate with the interior of elutriation conduits 446 through a plurality of apertures 456 and 458 respectively. Preferably these apertures are peripherally arranged around the circumference of conduits 446 so as to achieve a uniform removal therefrom of the elutriation fluid containing undesirable solids fines suspended therein. A modified form of aperture is shown in the extreme right-hand elutriation conduit in which the elutriation conduit is fabricated of three coaxially arranged sections spaced apart from one another. These sections include upper or acceleration section 460, intermediate section 462, and lower or elutriation section 464 leaving apertures 466 and 468 therebetween, communicating with disengaging zones 452 and 454 respectively. Various other modifications of the apertures described may obviously be employed for the same purpose.

The elutriation fluid which is passed upwardly through elutriation zones 470, e.g. that part of conduits 446 below the disengaging zones, may originate within column 402 at points below lower outlet openings 450. This fluid flows in separate streams upwardly through elutriation zones 470 and is disengaged in either or both of disengaging zones 452 and 454. The combined elutriation fluid containing the suspended solids fines is then withdrawn from disengaging zone 452 or 454 through line 472 at a rate controlled by valve 474 or through line 476 at a rate controlled by valve 478. With identical construction in each of the elutriation conduits 446, control of the entire elutriation fluid flow rate and elutriation velocities by either or both of valves 474 and 478 may be achieved. The upward fluid velocity in each of elutriation zones 470 will be identical and the degree of elutriation in each will be the same.

In the event that an outside source of elutriation fluid is required, it is introduced through line 480 controlled by valve 482 into elutriation fluid engaging zone 484 to pass in equal streams as described above.

It should be noted from the foregoing description that each of the elutriation conduits 446 is effectively divided into an acceleration zone 486, and an elutriation zone 470, with one or more intermediate fluid disengaging zones. If desired, a differential pressure controller not shown may be incorporated to maintain a zero pressure differential between the disengaging zone and the space contained in the solids feeding mechanism above the solids surge conduits 434. In this way the complete absence of fluid flow in the upper portion, or acceleration zone, of the elutriation conduits 446 may be insured.

The granular solids discharge as a shower from surge conduit openings 438 downwardly by gravity. They accelerate in acceleration zones 486 preferably to a velocity such that the larger solids are substantially at their terminal velocity relative to the fluid in the elutriation zone, and they are elutriated with a countercurrent elutriation flow in elutriation zones 470 to produce an elutriation fluid suspension containing only undesirable solids fines and an elutriated stream of desirable sized solid particles substantially free of the solids fines.

In the experimental verification of solids elutriation as above described, the fines were removed from a recirculating stream of synthetic bead cracking catalyst having a 4 to 8 nominal mesh size range. The elutriation conduits were two inches inside diameter and 24 inches long, and the fluid disengaging point was located 10 inches below the upper end of the elutriation conduit. The elutriation was effected at a temperature of about 950° F. and at a pressure of 350 p.s.i.g. using flue gas as the elutriation fluid. The catalyst was fed to the elutriation conduits at a rate of 9.6 tons per day each in a continuous stream from a surge zone of rectangular cross section which was 2 by 4 inches, 8 inches in length, and whose outlet opening was circular and 1.25 inches in diameter. The unelutriated catalyst fed to the elutriator contained 3.5% by weight of small granular solids having a mesh size of 10 and higher.

In the apparatus described the rate of elutriation gas flow was varied and samples were taken of the resulting fines stream and of the elutriated catalyst. The data follow:

TABLE I

*Elutriator performance*

| Elutriation Gas Flow, s.c.f./hr. | Tyler Mesh Size | |
|---|---|---|
| | Largest Fraction in Fines | Smallest Fraction in Main Stream |
| 1,250 | 32 | 35 |
| 1,500 | 24 | 28 |
| 1,750 | 16 | 20 |
| 2,000 | 14 | 16 |
| 2,250 | 10 | 12 |
| 2,500 | 9 | 10 |

The fractionation was found to be exceedingly good in that the elutriated fines stream contained none of the desirable 4 to 8 mesh material, even at the higher elutriation gas flow rates, and substantially all of the fine solids were removed from the main solids stream passing through the elutriator.

It is apparent that the solids feeding and elutriation system of the present invention constitutes a distinct improvement over those previously employed and that substantially improved degrees of solids fractionation are obtained. It is not to be understood that this system of solids handling is limited to elutriation of contact material employed in hydrocarbon conversion processes because, although it is exceedingly effective in such service, it has general utility in solids flow control and fines separation from substantially any moving stream of solid material. Furthermore the dimensions of the equipment and of the solids given above are solely illustrative, and the invention is not to be limited thereto, because the actual dimensions depend upon the solids flow rate and the physical characteristics of the solids and the elutriation fluid, and the proportion of smaller sized solids removed from the main solids stream.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. An improved method for separating substantially all the fine solids having mesh sizes above a certain predetermined value from a mixture thereof with larger solids whose mesh sizes are below said value which comprises passing the solids mixture downwardly by gravity at a substantially constant rate through at least one elongated acceleration zone for a sufficient time to impart to said larger solids velocities which are at least substantially equal to their terminal velocities relative to the moving fluid in the hereinafter-defined elutriation zone, and to form a shower of solids having a density between about 0.5% and about 30% by weight of the static bulk density of said solids mixture, passing said shower of accelerated solids through a disengaging zone and downwardly through an elongated elutriation zone, passing an elutriation fluid upwardly therethrough, controlling the flow rate thereof to suspend said fine solids, removing the resulting suspension containing substantially none of said larger solids from said disengaging zone, and collecting said larger solids substantially free of fines at the bottom of said elutriation zone.

2. An apparatus for the handling of granular solids which comprises an upper stationary tray supporting a bed of solids, at least one charge tube depending therefrom, a reciprocable tray below said charge tube and provided with at least one feeder tube dependent therefrom alignable on reciprocation with said charge tube, a lower stationary tray below said feeder tube, at least one solids surge chamber dependent from said lower stationary tray and alignable with said feeder tube, means for restricting the lower outlet area of said surge chambers to deliver a shower of dispersed solids, an elongated elutriation conduit disposed in solids receiving relation to said surge chamber, the cross sectional area of said elutriation conduit being larger than the cross sectional area of the communicating lower outlet of said surge chamber, means for introducing an elutriation fluid into the lower opening of said elutriation conduits, and means for removing fluid therefrom at an intermediate point along the length thereof, said fluid removing means comprising at least one pair of stationary parallel transverse trays through which said conduit extends, and defining a disengaging spaced therebetween, said disengaging space communicating through at least one aperture in the wall of said elutriation conduit with the interior thereof.

References Cited in the file of this patent

UNITED STATES PATENTS

| | | |
|---|---|---|
| 2,378,394 | Degnen et al. | June 19, 1945 |
| 2,416,230 | Simpson | Feb. 18, 1947 |
| 2,626,235 | Wilson | Jan. 20, 1953 |
| 2,647,587 | Berg | Aug. 4, 1953 |
| 2,754,966 | Kollgaard | July 17, 1956 |